(12) United States Patent
Iehl et al.

(10) Patent No.: US 6,712,585 B2
(45) Date of Patent: Mar. 30, 2004

(54) MAGNETIC PUMP

(75) Inventors: Victor C. Iehl, Waterloo, IA (US); Michael R. Crawford, Cedar Falls, IA (US); Howard Koth, Cedar Falls, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 0 days.

(21) Appl. No.: 10/234,753

(22) Filed: Sep. 4, 2002

(65) Prior Publication Data

US 2003/0053914 A1 Mar. 20, 2003

Related U.S. Application Data

(60) Provisional application No. 60/323,535, filed on Sep. 19, 2001.

(51) Int. Cl.[7] .................................................. F04B 49/00
(52) U.S. Cl. .................... 417/42; 310/156.05; 310/261; 417/410.1
(58) Field of Search ...................... 310/68 B, DIG. 3, 310/156.05, 156.06, 156.12, 156.28, 156.29, 156.38, 156.43, 156.49, 261, 264, 265; 417/42, 420, 44.1, 410.1

(56) References Cited

U.S. PATENT DOCUMENTS

| | | | | | |
|---|---|---|---|---|---|
| 4,587,450 | A | * | 5/1986 | Ozaki | 310/156 |
| 4,973,872 | A | * | 11/1990 | Dohogne | 310/156 |
| 5,096,390 | A | | 3/1992 | Sevrain et al. | |
| 5,197,865 | A | | 3/1993 | Sevrain et al. | |
| 5,256,038 | A | | 10/1993 | Fairman | |
| 5,323,078 | A | * | 6/1994 | Garcia | 310/156 |
| 5,325,005 | A | * | 6/1994 | Denk | 310/68 B |
| 5,353,491 | A | * | 10/1994 | Gentry et al. | 29/596 |
| 5,397,951 | A | * | 3/1995 | Uchida et al. | 310/156 |

* cited by examiner

*Primary Examiner*—Justine R. Yu
*Assistant Examiner*—Han L Liu
(74) *Attorney, Agent, or Firm*—Marshall, Gerstein & Borun LLP

(57) ABSTRACT

A brushless direct current magnetic pump includes a drive shaft that passes through and that is coupled to a magnet carrier. The magnet carrier with an annular sleeve with at least six outer ribs that define at least six slots that extend axially along the sleeve. The at least six slots accommodate at least six bar magnets and at least six sensor magnets. A Hall effect sensor is included in the motor assembly to provide positional information of the sensor magnets to a controller for improved speed control.

6 Claims, 3 Drawing Sheets

MAGNETIC PUMP

CROSS-REFERENCE TO RELATED APPLICATION

This application claims benefit under 35 U.S.C. §119(e) of U.S. provisional patent application Serial No. 60/323,535, filed Sep. 19, 2001, the disclosure of which is incorporated herein by reference.

TECHNICAL FIELD

An improved magnetic pump is disclosed. More specifically, a magnetic pump is disclosed that includes a brushless DC motor which comprises a magnetic carrier mounted to the drive shaft which carries at least six bar magnets. The drive shaft and carrier pass through a DC stator coil. At least six sensor magnets are used which transmit signals to a Hall effect sensor which, in turn, transmits feedback signals to a controller for an improved speed control.

BACKGROUND OF THE INVENTION

Gear pumps are conventionally housed in sealed enclosures from which the pump shaft extends. A drive motor is coupled to the shaft to rotate the shaft and pump rotor.

Typically, such "direct drive" pumps include dynamic bearing seals through which the drive shaft passes to prevent fluid leaks into the motor casing. The use of such dynamic bearing seals presents a number of problems. For example, the seals are exposed to constant frictional forces and, therefore, require maintenance to provide a leak-free environment for the motor. Further, excessive frictional loading by the seals on the pump shaft decreases pump efficiency and results in heat generation. These factors decrease pump reliability, pump lifetime and contribute to seal failure which can cause the motor to be exposed to the liquid being pumped.

To eliminate these problems, magnetic drive systems have been employed which eliminate the need for the drive shaft to pass through the pump the exterior of the pump enclosure. Such magnetic pumps are disclosed in U.S. Pat. Nos. 3,238,883, 4,111,614, 5,096,390 and 5,197,865.

The '883 and '614 patents disclose the use of brushed motors whereby electrically conductive brushes are spring biased against the rotor shaft to make electrical connections with the winding mounted onto the motor shaft. Due to their reliance upon an electro-mechanical contact against a moving element, the motor brushes are prone to intermittent contacts and ultimate failure.

To solve this problem, the '390 and '865 patents incorporate a brushless DC (BLDC) motor which utilize a stationary rotor coil through which the drive shaft passes. Circular magnets are mounted onto the drive shaft.

However, the use of circular magnets provides relatively poor speed control. In an attempt to overcome this problem, the '390 and '865 patents utilize a specially designed circuit board to control the operation of the pump. Because the pumps are intended to be used for a variety of purposes, the circuit boards must often be customized.

As a result, there is a need for an improved BLDC pump with improved speed control and with standardized electrical components that can be directly coupled to a controller. Such improved control would be important for metering applications with a positive displacement pump whereby variable loads are imposed on the pump due to changes in input and discharge pressure which can alter flowrate.

SUMMARY OF THE DISCLOSURE

In satisfaction of the aforenoted needs, a brushless direct current magnetic pump is provided that comprises a drive shaft that passes through and that is coupled to a magnet carrier. The magnetic carrier comprises an annular sleeve comprising an inner surface that engages the drive shaft and extends along a portion of the drive shaft. The sleeve further comprises an outer surface comprising at least six circumferentially spaced apart elongated ribs that extend axially along the outer surface of the sleeve. The sleeve further includes at least six elongated slots with each slot being disposed between two of the ribs. The pump also comprises at least six bar magnets with each bar magnet being accommodated in one of the slots so that the bar magnets are also circumferentially spaced around the outer surface of the annular sleeve. The pump also comprises at least six sensor magnets with each sensor magnet being accommodated in one of the slots so that the six sensor magnets are also circumferentially spaced around the outer surface of the annular sleeve. Each sensor magnet is also axially spaced apart from one of the bar magnets. Accordingly, each groove of the annular sleeve accommodates a bar magnet and a sensor magnet with the space therebetween. The sensor magnets are coupled to a Hall effect sensor for monitoring the speed and operation of the pump.

In a refinement of the above concept, the pump comprises eight bar magnets and eight sensor magnets and, therefore, the sleeve comprises eight ribs and eight slots.

In a further refinement, the Hall effect sensor is linked to a controller for controlling and monitoring the speed and operation of a pump.

In yet a further refinement, an improved system for manufacturing foam is provided which includes at least two pumps as described above. One of the pumps has an inlet that is connected to a supply of a first reagent. The other of the pumps has an inlet that is connected to a supply of a second reagent. Each of the pumps has an outlet that is connected to the Hall effect sensors of each of the pumps are linked to a common controller for controlling the operation and the speed of the two or more pumps.

Figure 1:
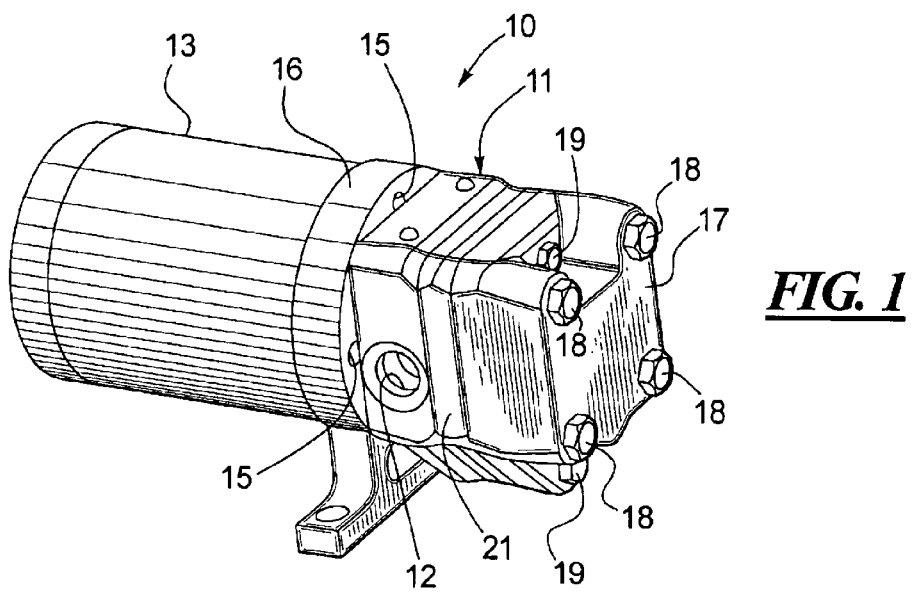
FIG. 1 is a perspective view of a pump made in accordance with the disclosure.
Figure 2:
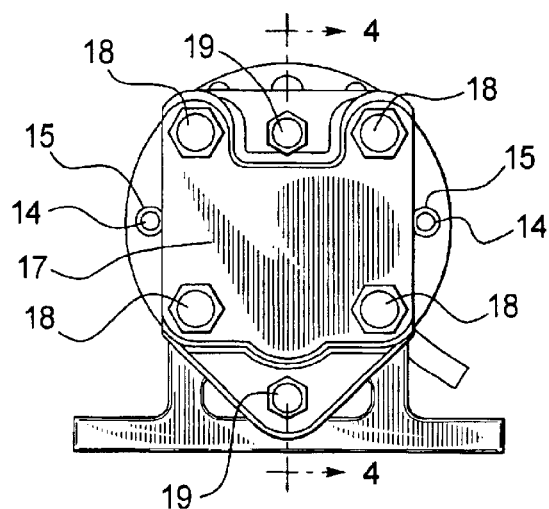
FIG. 2 is an end view of the pump shown in FIG. 1.
Figure 3:
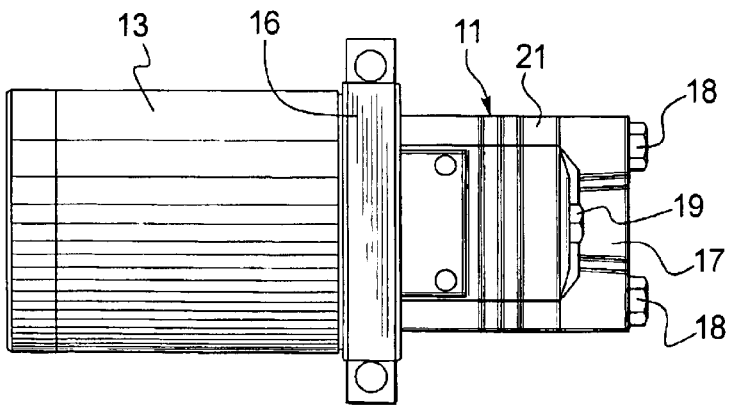
FIG. 3 is a top plan view of the pump shown in FIG. 1.

It should be understood that the drawings are not necessarily to scale and that the embodiments are sometimes illustrated by graphic symbols, phantom lines, diagrammatic representations and fragmentary views. In certain instances, details which are not necessary for an understanding of the disclosure or which render other details difficult to perceive may have been omitted. It should be understood, of course, that the disclosure is not necessarily limited to the particular embodiments illustrated herein.

DETAILED DESCRIPTION OF THE PRESENTLY PREFERRED EMBODIMENTS

FIGS. 1–4 illustrate a pump 10 that includes a casing 11 having an inlet or outlet port 12 (the other of the inlet or outlet port not being shown) and that is connected to a motor housing 13. The casing 11 is connected to the motor housing 13 by a plurality of bolts 14 (see FIG. 4) that pass through the holes 15 of the plate 16. The open ended casing 11 is enclosed by a head cover 17. The head cover 17 is secured to the casing 11 by the bolts 18, 19 which also pass through the spacer plate 21 which, in turn, forms a pump chamber with the rotor and idler gears 22, 23, respectively (see FIG. 4).

Figure 4:
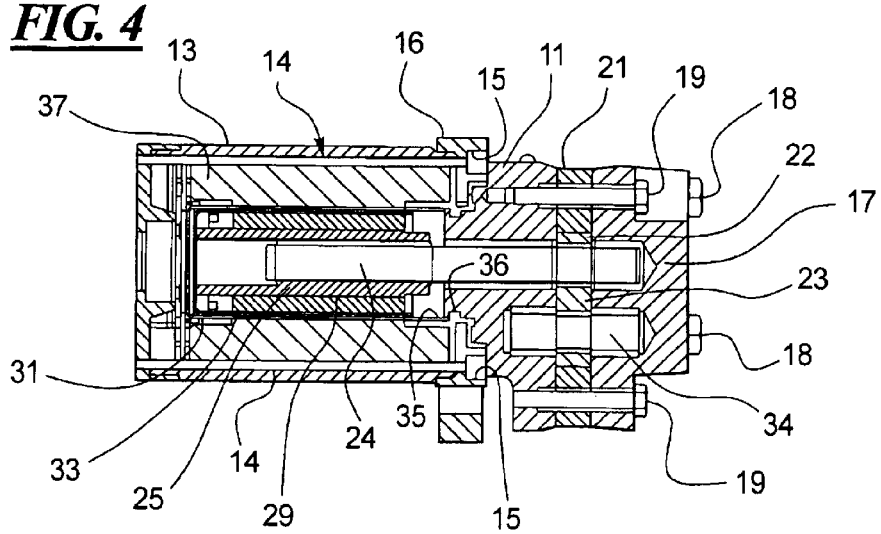
FIG. 4 is a sectional view taken substantially along the line 4—4 of FIG. 2.
Figure 6:
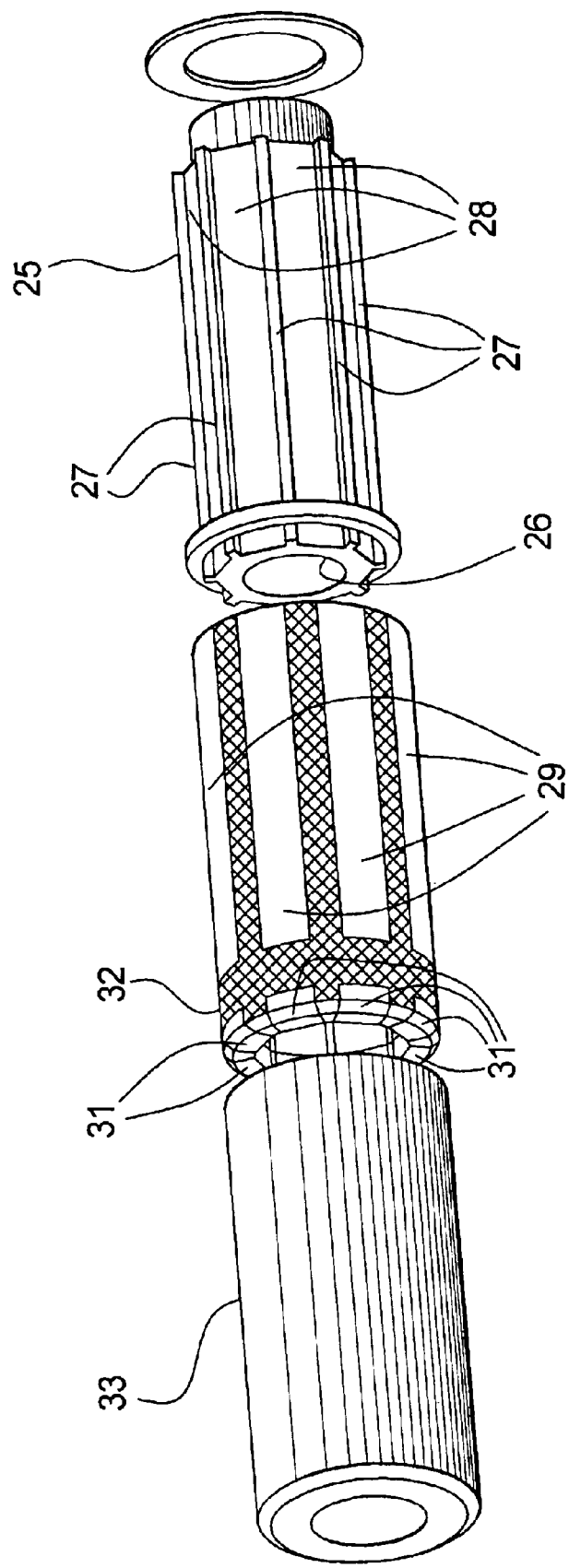
FIG. 6 is an exploded view of the magnet carrier, magnet, magnet cover and cover end plate of the pump illustrated in FIGS. 1–5.

Turning to FIG. 4, a drive shaft 24, a magnet carrier 25. The magnet carrier 25 is secured to the drive shaft 24 with a tongue and groove connection, adhesive connection, strong frictional fit or the like. As shown in FIG. 6, the magnet carrier 25 comprises an annular sleeve with an inner surface 26 that engages the drive shaft 24 and an outer surface that comprises a plurality of radially outwardly extending ribs 27 that are circumferentially spaced around the outside surface of the sleeve 25. The ribs 27 are spaced apart and therefore two ribs 27 define a slot 28 disposed therebetween. Each slot 28 accommodates a bar magnet 29 that extends substantially along the length of the slot 28. Each slot 28 also accommodates a sensor magnet 31 that is spaced apart from its respective bar magnet 29 as shown in FIG. 6. Potting material 32 covers the ribs 27 and separates the adjacent bar magnet 29 as well as the adjacent sensor magnets 31 and the sensor magnets 31 from the bar magnets 29. The magnet carrier 25, magnets 29, potting material 32, and sensor magnets 31 are encased in a magnet cover 33.

FIG. 4 also illustrates the connection between the drive shaft 24 and rotor gear 22 which is enmeshed with the idler gear 23. The idler gear 23 rotates freely and is mounted on an idler shaft 34. The sealing canister 35 is also provided that surrounds the magnet cover 33 and which extends between the annular plate 16 and the casing 11. The o-ring 36 provides a suitable seal between the casing 11, and canister 16 to thereby prevent any leakage of fluid to the stator windings 37.

Figure 5:
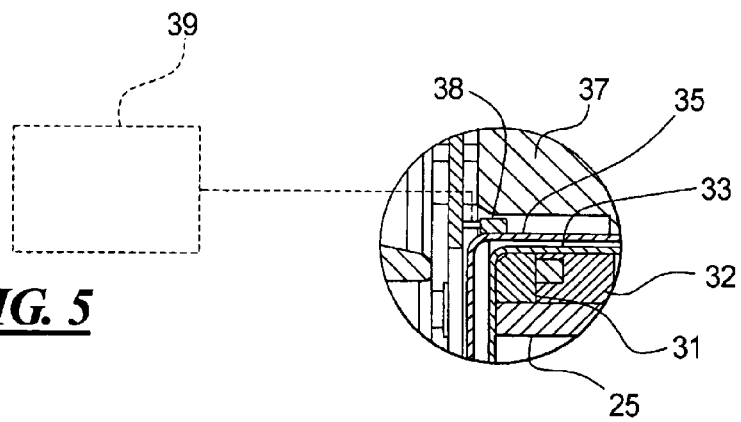
FIG. 5 is a partial enlarged sectional view taken substantially along the line 4—4 of FIG. 2 and illustrating the location of the Hall effect sensor relative to the sensor magnet.

Turning to FIG. 5, a Hall effect sensor 38 is disposed between the stator windings 37 and canister 35. The Hall effect sensor effectively determines the location of the sensor magnets 31. The Hall effect sensor 38 is preferably linked to a controller 39 (shown in phantom in FIG. 5).

In a preferred embodiment, eight bar magnets 29 and eight sensor magnets 31 are employed. It has been found that using such an eight pole configuration provides improved speed control by way of the Hall effect sensor 38. While it will be noted that the use of eight bar magnets 29 and eight sensor magnets 31 is preferred, suitable embodiments can be fabricated using six bar magnets 29 and six sensor magnets 31. The improved control is a result of more frequent rotor position feedback signals sent by the Hall effect sensor 38 to the controller 39. As a result, when either input or output pressure varies thereby affecting the load on the pump 10, the controller 39 can sense speed variation by way of the Hall effect sensor 38 and, accordingly, increase or decrease the current supplied to the stator winding 37.

Figure 7:
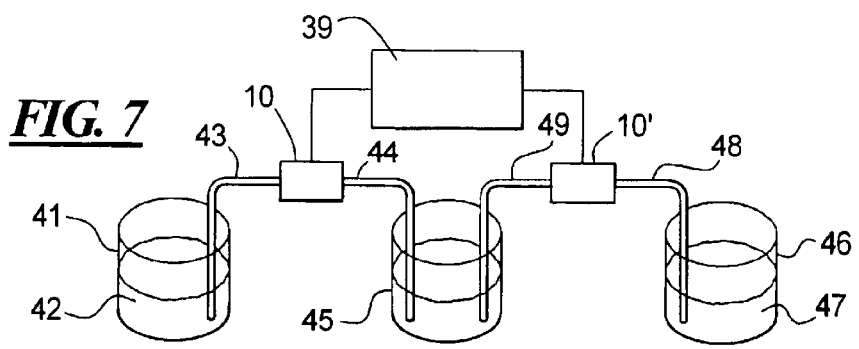
FIG. 7 schematically illustrates the use of two pumps in a foam manufacturing system.

FIG. 7 illustrates one application for the disclosed pumps 10. Specifically, a pump 10 can be coupled to a first supply tank 41 containing a first reagent 42. A hose 43 can be connected to the inlet of the pump 10. A hose 44 can be connected to the outlet of the pump 10 which also extends into a reaction vessel 45. Similarly, a pump 10' can be coupled to a supply tank 46 that holds a second reagent 47 by an inlet line 48. An outlet line 49 can connect the outlet of the pump 10' to the reaction vessel 45. A controller 39 is linked to the Hall effect sensors of the pumps 10, 10'. It will be noted that the inlet pressure to the pumps 10 and 10' can vary as the head pressure in the supply vessels 41, 46 varies. As a result of the varying head pressure, conventional pumps would tend to speed up or slow down. However, with the unique combination of the Hall effect sensors 38 (see FIG. 5) and six or more sensor magnets 31 and bar magnet 29, improved speed control can be performed by way of the controller 39. The apparatus illustrated in FIG. 7 is particularly useful for the fabrication of foam materials where typically two reagents are mixed together to form a foam. Of course, the system illustrated in FIG. 7 could be expanded to include more than two pumps 10, 10'.

The slots 28 and ribs 27 may be machined, cast or ground into the sleeve.

While only certain embodiments have been set forth, alternative embodiments and various modifications will be apparent from the above description to those skilled in the art. These and other alternatives are considered equivalents and within the spirit and scope of the disclosure.

What is claimed is:

1. A brushless direct current magnetic pump comprising:
   a drive shaft that passes through and that is coupled to a magnet carrier,
   the magnet carrier comprising an annular sleeve comprising an inner surface that engages the drive shaft extends along a portion of the drive shaft, the sleeve further comprising an outer surface comprising at least six circumferentially spaced apart elongated ribs that extend axially along the outer surface of the sleeve and at least six elongated slots, each slot being disposed between two of the ribs,
   at least six bar magnets, each bar magnet being accommodated in one of the slots so that the at least six bar magnets are circumferentially spaced around the outer surface of the annular sleeve,
   at least six sensor magnets, each sensor magnet being accommodated in one of the at least six slots so that the at least six sensor magnets are circumferentially spaced around the outer surface of the annular sleeve, each sensor magnet being axially spaced apart from one of the bar magnets,
   the sensor magnets being coupled to a Hall effect sensor.

2. The pump of claim 1 wherein the pump comprises eight ribs, eight slots, eight bar magnets and eight sensor magnets.

3. The pump of claim 1 wherein the Hall effect sensor is linked to a controller.

4. A brushless direct current magnetic pump comprising:
   a drive shaft that passes through and that is coupled to a magnet carrier,
   the magnet carrier comprising an annular sleeve comprising an inner surface that engages the drive shaft extends along a portion of the drive shaft, the sleeve further comprising an outer surface comprising eight circumferentially spaced apart elongated ribs that extend axially along the outer surface of the sleeve and eight elongated slots, each slot being disposed between two of the ribs,
   eight bar magnets, each magnet being accommodated in one the slots so that the eight bar magnets are circumferentially spaced around the outer surface of the annular sleeve, eight sensor magnets, each sensor magnet being accommodated in one of the eight slots so that the eight sensor magnets are circumferentially spaced around the outer surface of the annular sleeve, each sensor magnet being axially spaced apart from one of the bar magnets, the sensor magnets being coupled to a Hall effect sensor.

5. The pump of claim 4 wherein the Hall effect sensor is linked to a controller.

6. A method of controlling the speed of a brushless direct current magnetic pump that comprises a drive shaft that passes through and that is coupled to a magnet carrier, the magnet carrier comprising an annular sleeve comprising an inner surface that engages the drive shaft extends along a portion of the drive shaft, the sleeve further comprising an outer surface comprising at least six circumferentially spaced apart elongated ribs that extend axially along the outer surface of the sleeve and at least six elongated slots, each slot being disposed between two of the ribs, at least six bar magnets, each magnet being accommodated in one the slots so that the at least six bar magnets are circumferentially spaced around the outer surface of the annular sleeve, at least six sensor magnets, each sensor magnet being accommodated in one of the at least six slots so that the at least six sensor magnets are circumferentially spaced around the outer surface of the annular sleeve, each sensor magnet being axially spaced apart from one of the bar magnets, the sensor magnets being coupled to a Hall effect sensor, and a stator winding disposed around the magnet carrier, the method comprising:

coupling the Hall effect sensor to a controller, the Hall effect sensor sending feedback signals to the controller indicative of rotational positions the sensor magnets; and controlling current supplied to the stator winding based, in part, on the feedback signals.

* * * * *

UNITED STATES PATENT AND TRADEMARK OFFICE
CERTIFICATE OF CORRECTION

PATENT NO. : 6,712,585 B2
DATED : March 30, 2004
INVENTOR(S) : Iehl et al.

It is certified that error appears in the above-identified patent and that said Letters Patent is hereby corrected as shown below:

Column 4,
Lines 66-67, please delete "in one the slots" and insert -- in one of the slots -- in its place.

Column 6,
Lines 1-2, please delete "in one the slots" and insert -- in one of the slots -- in its place.

Signed and Sealed this

Twenty-ninth Day of June, 2004

JON W. DUDAS
*Acting Director of the United States Patent and Trademark Office*